United States Patent [19]

Hu

[11] Patent Number: 5,033,552

[45] Date of Patent: Jul. 23, 1991

[54] MULTI-FUNCTION ELECTRIC TOOL

[76] Inventor: Cheng-Te Hu, 317, Tu Tou Tsun, Kuan Tien Hsiang, Tainan Hsien, Taiwan

[21] Appl. No.: 556,416

[22] Filed: Jul. 24, 1990

[51] Int. Cl.[5] .............................................. B23B 45/02

[52] U.S. Cl. .................................... 173/163; 173/170; 7/158; 7/165; 51/181 R; 241/37.5

[58] Field of Search .................. 173/163, 170; 408/20, 408/239 A; 279/1 A; 51/181 R; 7/158, 165; 241/37.5

[56] References Cited

U.S. PATENT DOCUMENTS

| | | | |
|---|---|---|---|
| 3,724,237 | 4/1973 | Wood | 64/4 |
| 3,759,336 | 9/1973 | Marcovitz et al. | 173/163 |
| 4,685,625 | 8/1987 | Mazza | 241/36 |
| 4,924,578 | 5/1990 | Chagnon et al. | 30/500 |
| 4,976,173 | 12/1990 | Yang | 81/54 |

FOREIGN PATENT DOCUMENTS

| | | | |
|---|---|---|---|
| 0044245 | 3/1985 | Japan | 173/163 |

*Primary Examiner*—Frank T. Yost
*Assistant Examiner*—John M. Husar
*Attorney, Agent, or Firm*—Morton J. Rosenberg; David I. Klein

[57] ABSTRACT

A multi-function tool system (200) which includes a singular tool housing (1) containing an electric motor (10). A plurality of tool head housings (2, 2′, 2″, and 2‴) contain respective reduction gears (20) having particular speed ratios to allow individual tool members to be driven in a rotative member at an optimal rotative speed. In this manner, a singular tool housing (1) may be used in conjunction with a plurality of tool members which rotate at differing speeds.

1 Claim, 6 Drawing Sheets

MULTI-FUNCTION ELECTRIC TOOL

BACKGROUND OF THE INVENTION

The subject invention is directed to a multi-function tool system which allows use of a singular tool housing with a plurality of individual tool head housings having respective tools. In particular, this invention relates to a multi-function tool having an electric motor drive system located within the tool housing and a plurality of individual tool head housings adapted to be mounted on the tool housing. Still further, this invention directs itself to a multi-function tool system wherein a plurality of tool head housings are adapted for interface with a singular tool housing. Still further, this invention directs itself to a multi-function tool system where each tool head housing has contained therein a respective reduction gear in order that one tool housing can be used for a plurality of tool members. Still further, this invention is related to a multi-function tool system having a safety switch which allows the user to deactuate a rotatively displaceable tool. Still further, this invention directs itself to a multi-function tool system where a safety switch mechanism is displaceably mounted on the tool housing and includes an extension or lug member for reversible insertion into a recess or blind hole formed in a tool head housing.

PRIOR ART

Electric tools are well known in the prior art. Additionally, multi-function electric tools allowing insert of differing tool members into a singular tool housing is known in the prior art. However, in all prior art systems known to the Applicant, the drive or electric motor system and the associated reduction gear are generally installed in the main tool housing and thus does not accommodate differing tool members which are to be rotatively driven at different rotative speeds. As an example, a cordless screw driver system would not fit a drill head tool member due to the fact that the specific rotational speed necessary for the screwdriver is not in accordance with the rotative speed necessary for a drill member.

SUMMARY OF THE INVENTION

A multi-function tool system includes a tool housing having an electric motor contained therein. The electric motor is coupled to a driving gear which extends external to the tool housing. At least one tool head housing having a reduction gear contained therein is provided and the driving gear and the reduction gear are matingly engageable for rotatively driving a tool member extending from the tool head housing. Additionally, a safety switch mechanism is provided which is displaceably mounted on the tool housing and includes a safety switch lug member for reversible insertion into a blind hole formed in the tool head housing. The safety switch mechanism allows for rotatively actuating the tool member when the safety switch lug member is at least partially inserted into the blind hole and also deactivates any rotative displacement of the tool member when the safety switch lug member is external the blind hole formed in the tool head housing.

It is a primary objective of the present invention concept to provide a multi-function tool system which allows coupling of a tool housing to a plurality of tool head housings.

It is a further object of the subject invention to provide a multi-function tool system which is portable in nature.

It is still a further object of the subject invention to provide a multi-function tool system which includes a safety switch mechanism which allows for the changing or replacing of tool head housings in a safe manner.

DESCRIPTION OF THE PREFERRED EMBODIMENTS

Figure 1:
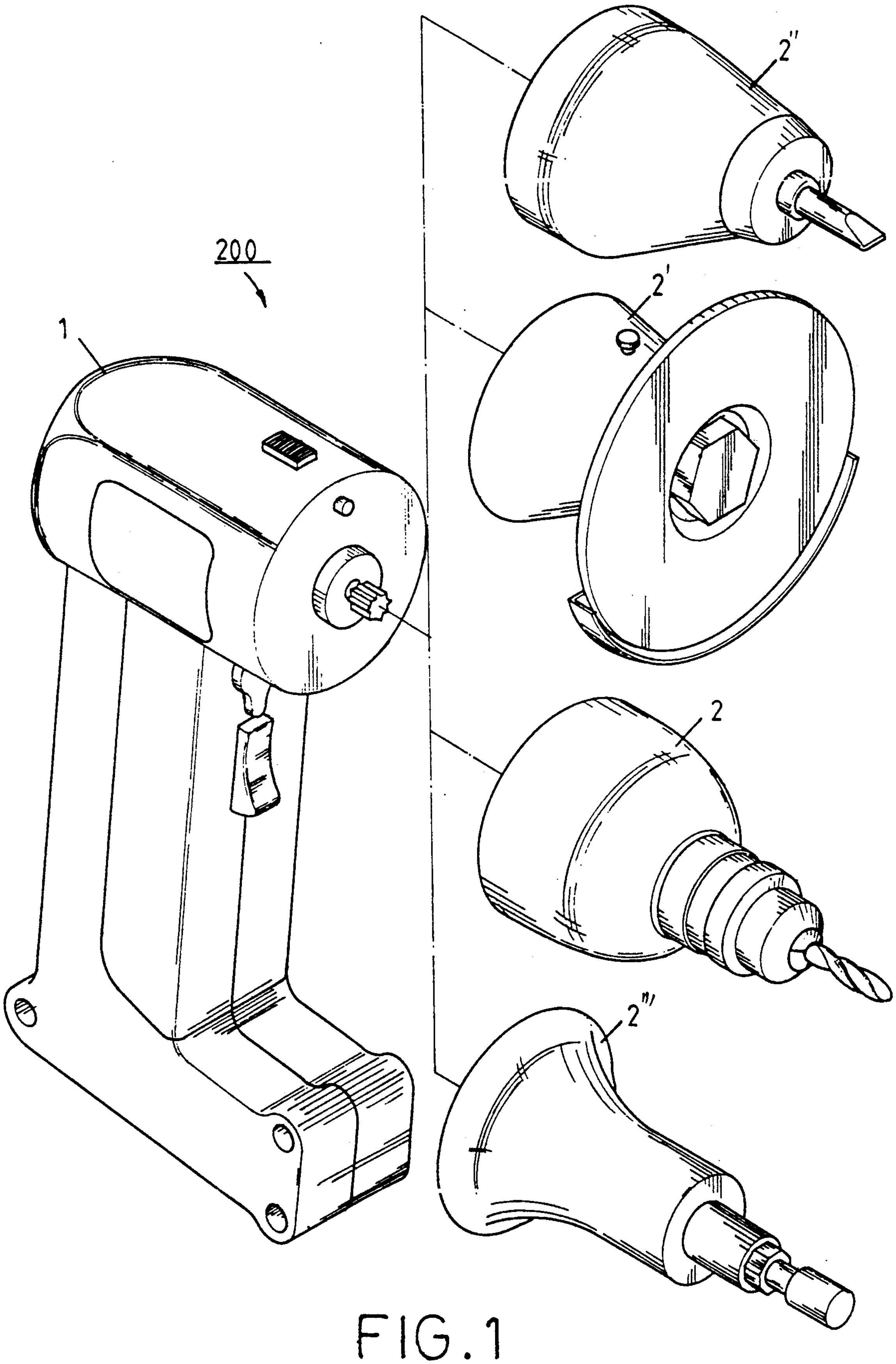
FIG. 1 is a perspective view of a multi-function tool system showing a singular tool housing adaptable for engagement with a plurality of tool head housings.
Figure 2:
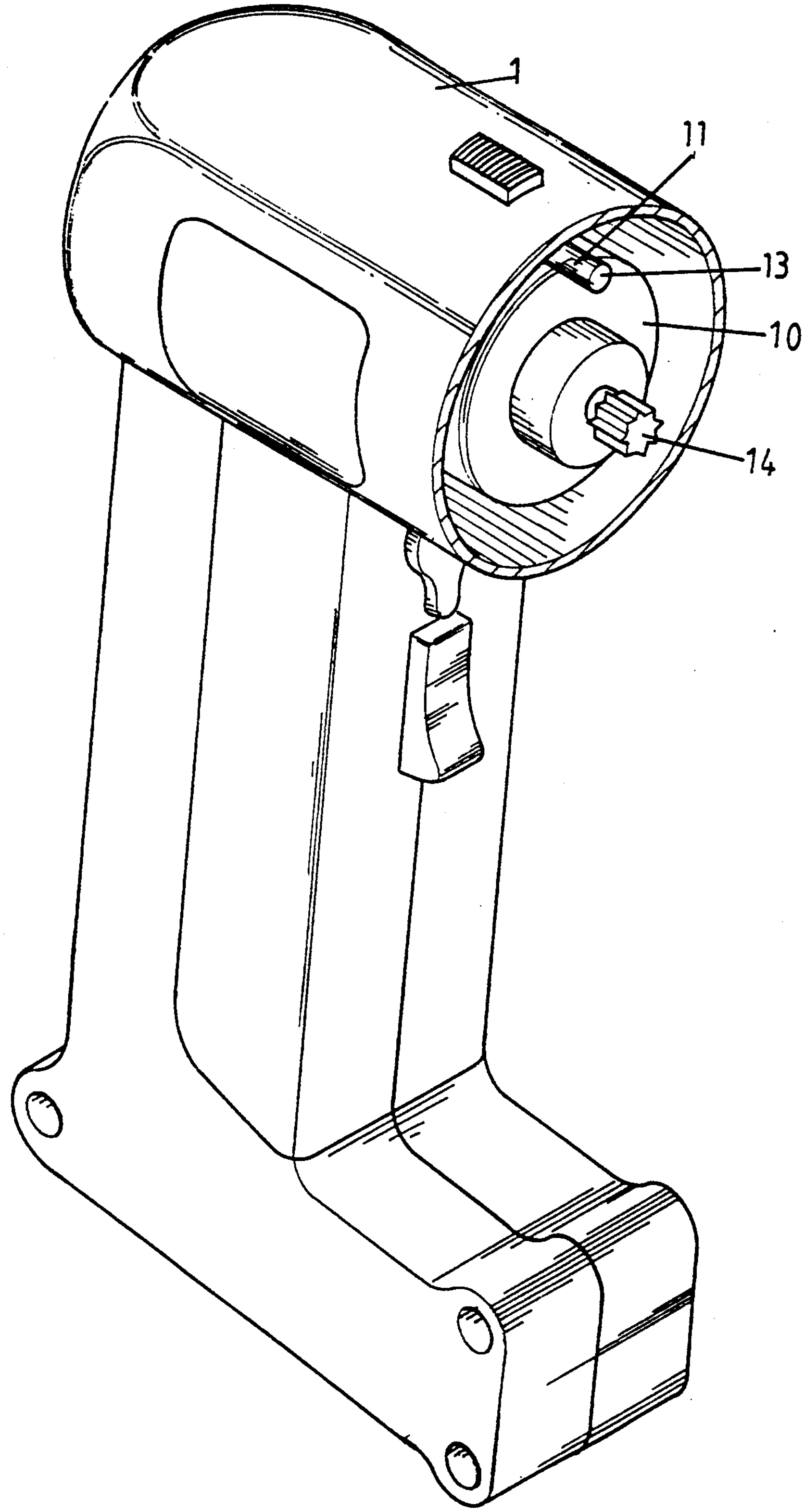
FIG. 2 is a perspective view of a tool housing showing the driving gear and safety switch lug member.

Referring now to FIGS. 1-5, there is shown multi-function tool system 200 having a singular tool housing 1 adaptable for engagement with a plurality of tool head housings 2, 2', 2'', and 2'''. Referring to FIG. 2, multi-function tool system 200 includes standard electric motor 10 fixedly coupled in a rotative manner to driving gear 14. Additionally, as will be described in following paragraphs, there is provided safety switch 11 which allows a safe replacement of tool head housings 2, 2', 2'', and 2 ''' at the discretion of the user. Electric motor 10 is installed and mounted in tool housing 1 to rotatively actuate driving gear 14.

Figure 6A:
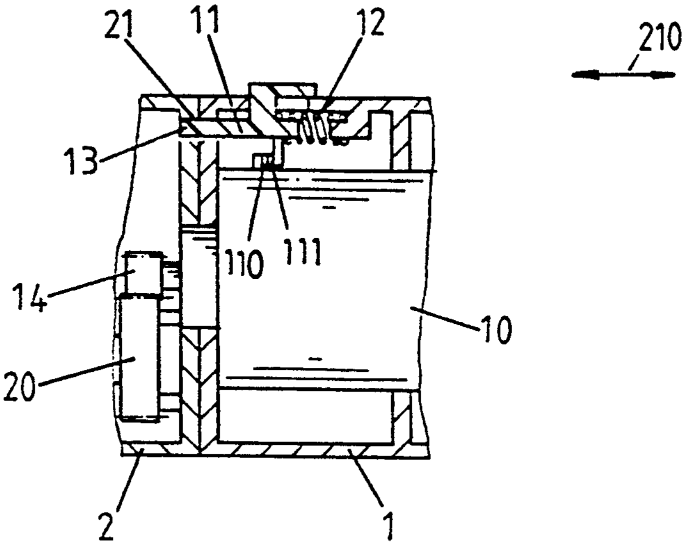
FIG. 6A is a cross-sectional view of a tool housing showing the safety switch mechanism of the subject invention concept; and, FIG. 6B is a cross-sectional view partially cut away of the subject invention showing engagement of a tool head housing to a tool housing.

Referring to FIG. 6A, safety switch mechanism 11 is slidably displaceable in horizontal direction 210 and is mounted internal and partially external to tool housing 1. Safety switch mechanism 11 includes spring 12 which provides a biasing force against safety switch extension end or lug member 13 in direction 210 external tool housing 1. By displaceably sliding safety switch 11 against the biasing force of spring 12, lug member or extension end 13 may be retracted into tool housing 1.

Figure 3:
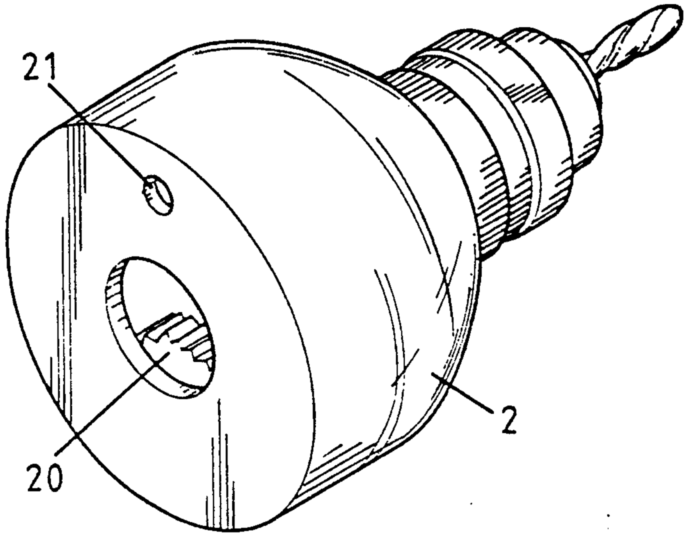
FIG. 3 is a perspective view of a tool head housing showing a reduction gear contained therein and a blind hole for insert of the safety switch lug member.

Referring to FIGS. 1 and 3, tool head housing 2 includes internally located reduction gear 20 for being rotatively activated through mating engagement of driving gear 14 shown in FIG. 6A and FIG. 2. Actuation of electric motor 10 provides for respective rotative displacement of driving gear 14 and driving gear 14 being matingly engaged with reduction gear 20 allows for respective rotation of reduction gear 20. Tool head housing 2 further includes recess or blind hole 21 formed therein as can clearly be seen in FIG. 3. Recess 21 is for the purpose of insertion of extension end or lug member 13 of the safety switch mechanism 11. Insertion of lug member 13 into blind hole 21 is seen in FIG. 6A.

When any of the tool head housings 2, 2', 2'', or 2''' shown in FIG. 1 are to be connected to tool housing 1, extension end 13 of safety switch mechanism 11 is inserted into blind hole 21.

When extension end 13 is inserted into blind hole 21 as shown in FIG. 6A, contacts 110 and 111 are contiguously engaged as is seen. Contacts 110 and 111 merely allow for the closing of the power for electric motor 10. Obviously, when contacts 110 and 111 are displaced from each other, the electric motor circuit is open and electric motor 10 is deactuated. When contacts 110 and 111 are in contiguous contact, driving gear 14 is rotatively displaceable responsive to actuation of electric motor 10 and a respective rotation of mating reduction gear 20 is provided responsive to the rotative displacement of driving gear 14.

In the event that the extension end 13 of safety switch mechanism 11 is not inserted into blind hole 21, contacts 110 and 111 are displaced each from the other and the electric motor circuit is open resulting in the fact that electric motor 10 cannot be actuated.

Figure 4:
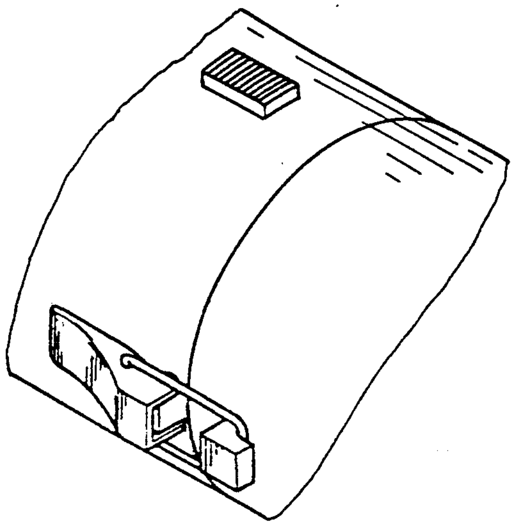
FIG. 4 is a perspective cut away view of the external surface of a tool housing and a tool head housing in coupled relation.
Figure 5:
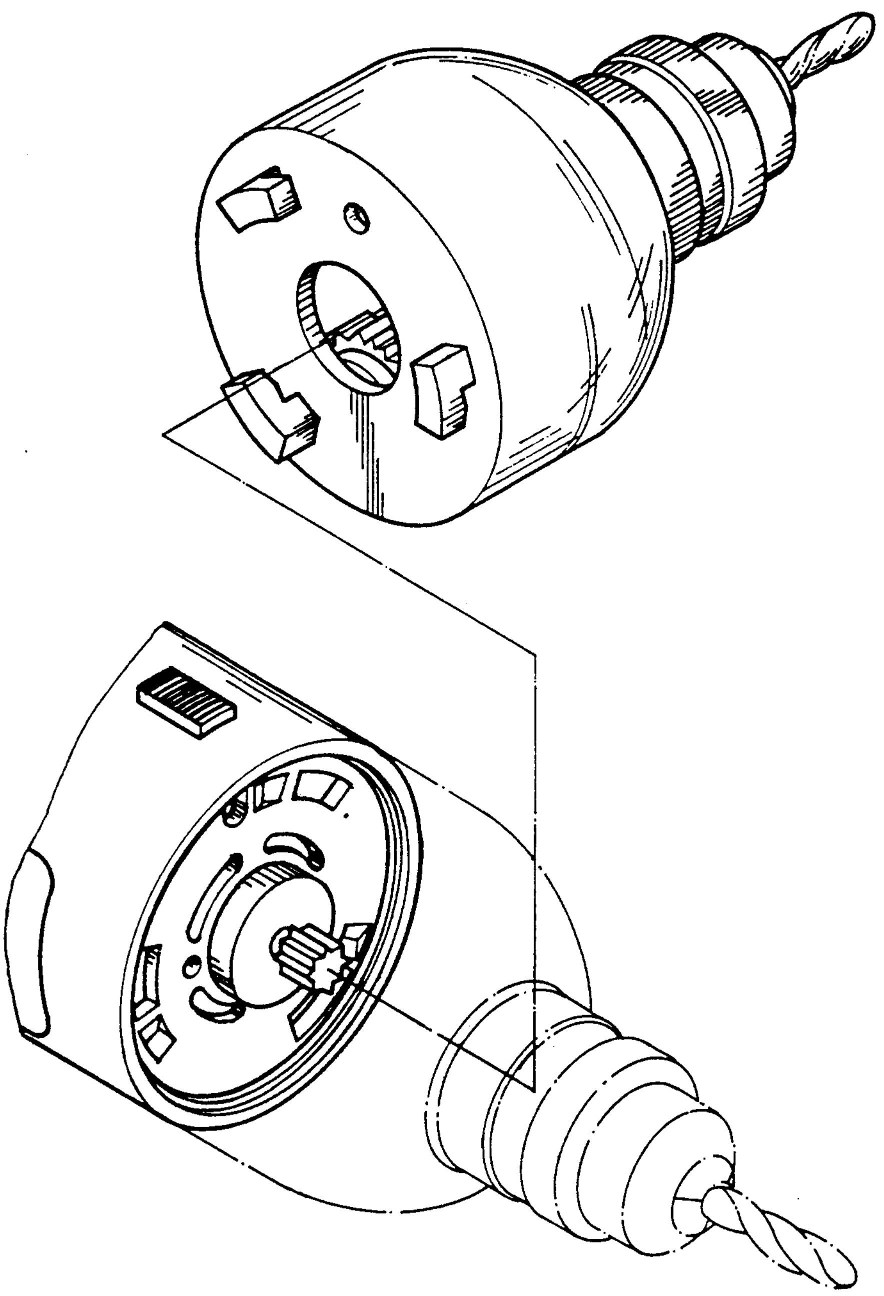
FIG. 5 is a perspective view partially cut away of a tool housing and tool head housing.
Figure 6B:
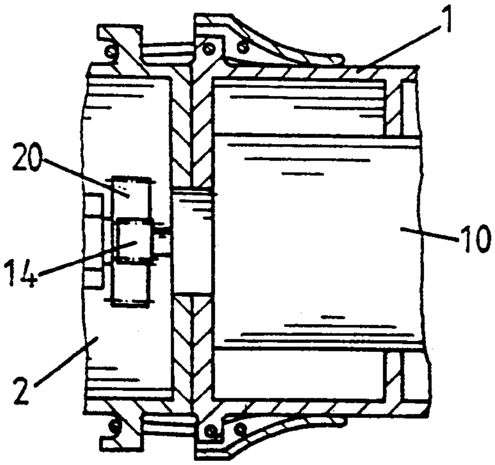

Tool housing 1 and tool head housings 2, 2', 2'', and 2''' may be fastened or coupled each to the other in a plurality of well known ways such as that shown in FIG. 4 and FIG. 6B. The particular fastening procedure between tool housing 1 and a particular tool head housing 2 is well known by those skilled in the art and will not be described herein. The tool heads 2, 2', 2'', and 2''' are all associated with differing tool members which have respective and distinctive optimal rotating speed ratios. Each of the respective tool head housings 2, 2', 2'', and 2''' include a particular reduction gear 20 which is tailored to the particular efficient rotating speed ratio to give optimal driving power to a particular tool member. In this manner, one tool housing 1 may be used for a plurality of tool head housings 2, 2'', 2'', and 2''' and provide for an optimized system.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

I claim:

1. A multi-function tool system comprising:

(a) a tool housing having an electric motor contained therein, said electric motor being coupled to a driving gear extending external said tool housing;

(b) at least one tool head housing having a reduction gear contained therein, said driving gear and said reduction gear being matingly engageable for rotatively driving a tool member extending from said tool head housing; and, (c) safety switch means displaceably mounted to said tool housing including a safety switch lug member for reversible insertion into a blind hole formed in said tool head housing for, (1) rotatively actuating said tool member when said safety switch lug member is at least partially inserted into said blind hole, and (2) deactuating a rotative displacement of said tool member when said safety switch lug member is external said blind hole formed in said tool head housing.

* * * * *